Patented Aug. 11, 1925.

1,549,314

UNITED STATES PATENT OFFICE.

FREDERICK CONLIN, OF WESTFIELD, NEW JERSEY, ASSIGNOR TO JOHN T. PRATT, OF NEW YORK, N. Y., DANIEL D. JACKSON, OF BROOKLYN, NEW YORK, AND JOSEPH D. SEARS, OF BLOOMFIELD, NEW JERSEY, AS JOINT TRUSTEES.

DESULPHURIZING COMPOSITION AND METHOD OF AGGREGATING THE SAME.

No Drawing. Application filed March 21, 1925. Serial No. 17,442.

*To all whom it may concern:*

Be it known that I, FREDERICK CONLIN, a citizen of the United States of America, residing in Westfield, county of Union, and State of New Jersey, have invented certain new and useful Improvements in Desulphurizing Compositions and Methods of Aggregating the Same, of which the following is a specification.

This invention relates to a composition for use in desulphurizing metals, particularly iron and steel, and to a method of aggregating the same, and aims to provide improvements therein.

In a previous application filed by the present applicant jointly with Daniel D. Jackson and Joseph D. Sears (Serial No. 538,423, filed February 22, 1922), there is disclosed the use of composition of sodium carbonate and an alkaline metal silicate, among others, for desulphurizing. The present invention is an improvement upon said previous invention making use of special properties of said ingredients for forming briquettes.

According to the present invention the alkali-metal silicate, particularly that known as water-glass, is made into a water solution, and this water solution mixed with the sodium carbonate to form a plastic mass which is molded into briquette form, which by a combination of crystallization and air drying becomes a hard coherent brick or briquette. These bricks or briquettes can be made to have a strength comparable to burned clay brick, and have the advantage of being manufactured by machinery such as is used in forming green or unburned clay brick, and of being handled and shipped like burned clay brick (except, of course, that they should be protected from rain). As a consequence, this desulphurizing composition can be manufactured and transported at a minimum of expense.

What is regarded as the preferred mode of procedure in the manufacture of the briquettes is as follows. A solution of water-glass is made up by mixing one pound of sodium silicate solution (commercial water-glass) of 40° Baumé in about four pounds of water. This solution is placed in a mixing machine, such as a pug-mill, and ten pounds of sodium carbonate (soda ash) added. This is mixed in the mixing machine to a plastic state, and before the mixture sets or stiffens, is molded in brick or briquette form, preferably in a mechanical molding machine such as used in molding clay bricks. After molding the bricks are taken from the machine and laid out under cover (or stacked in the manner of clay brick) and allowed to complete setting or crystallization and evaporation of the surplus water or moisture. After about twenty-four hours most of the excess moisture will have been evaporated, and the brick or briquette will have become quite hard and coherent. Evaporation has been found to practically cease after about seventy-two hours.

These bricks or briquettes are hard or tough enough for rough handling and may be piled and shipped in closed freight cars without boxing or wrapping.

The bricks or briquettes are used in ladles or reservoirs containing molten metal, for desulphurizing the metal.

The briquettes have a practically uniform weight and constitution, and from this fact the workman can be instructed to use so many per ton of molten metal and thereby the workman is able to readily compute the number of bricks to be used from the tonnage of the metal in the ladle, forehearth or other container.

In practice, the briquettes are preferably made of such a size that one or more may be thrown into the reservoir ladle or other container at each filling of a smaller ladle from said reservoir ladle. The weight of briquettes used would therefore be in proportion to the quantity of metal poured from the reservoir ladle to the smaller ladles. As an alternative, the briquettes could be added at each tapping of the metal from the cupola.

Somewhat more or less of the water solution given above, and more or less water than that given for making the solution, may be used, the brick being harder when more of the silicate solution is used, and softer when less is used.

It is quite possible that these bricks or briquettes will be found useful for other purposes than for desulphurization.

The constituents can be aggregated or bound together in other forms than bricks or briquettes, as in the form of flakes, slabs, sticks and the like, which forms are regarded as equivalents of the bricks or briquettes and as within the scope of the invention and claims.

What is claimed is:

1. A desulphurizing composition in brick or briquette form, containing sodium carbonate and water-glass, and aggregated or bound together by said water-glass and by the crystallization of said sodium carbonate.

2. A desulphurizing composition in brick or briquette form, containing sodium carbonate and water-glass, and aggregated or bound together by said water-glass and crystallization of said sodium carbonate, said sodium carbonate being present in approximately 90% of the whole, excluding water or water of crystallization, and the remainder water-glass.

3. The method of briquetting or aggregating desulphurizing compositions comprising mixing sodium carbonate and a solution of water-glass, and molding.

4. The method of briquetting or aggregating desulphurizing compositions comprising mixing sodium carbonate and a solution of water-glass, and molding, said ingredients being mixed in the approximate proportions of 10 pounds of sodium carbonate to a solution of 1 pound of water-glass 40° Baumé diluted in 4 pounds of water.

In witness whereof, I have hereunto signed my name.

FREDERICK CONLIN.